(No Model.)
A. GROVES.
CLOTHES WRINGER.
No. 389,805. Patented Sept. 18, 1888.
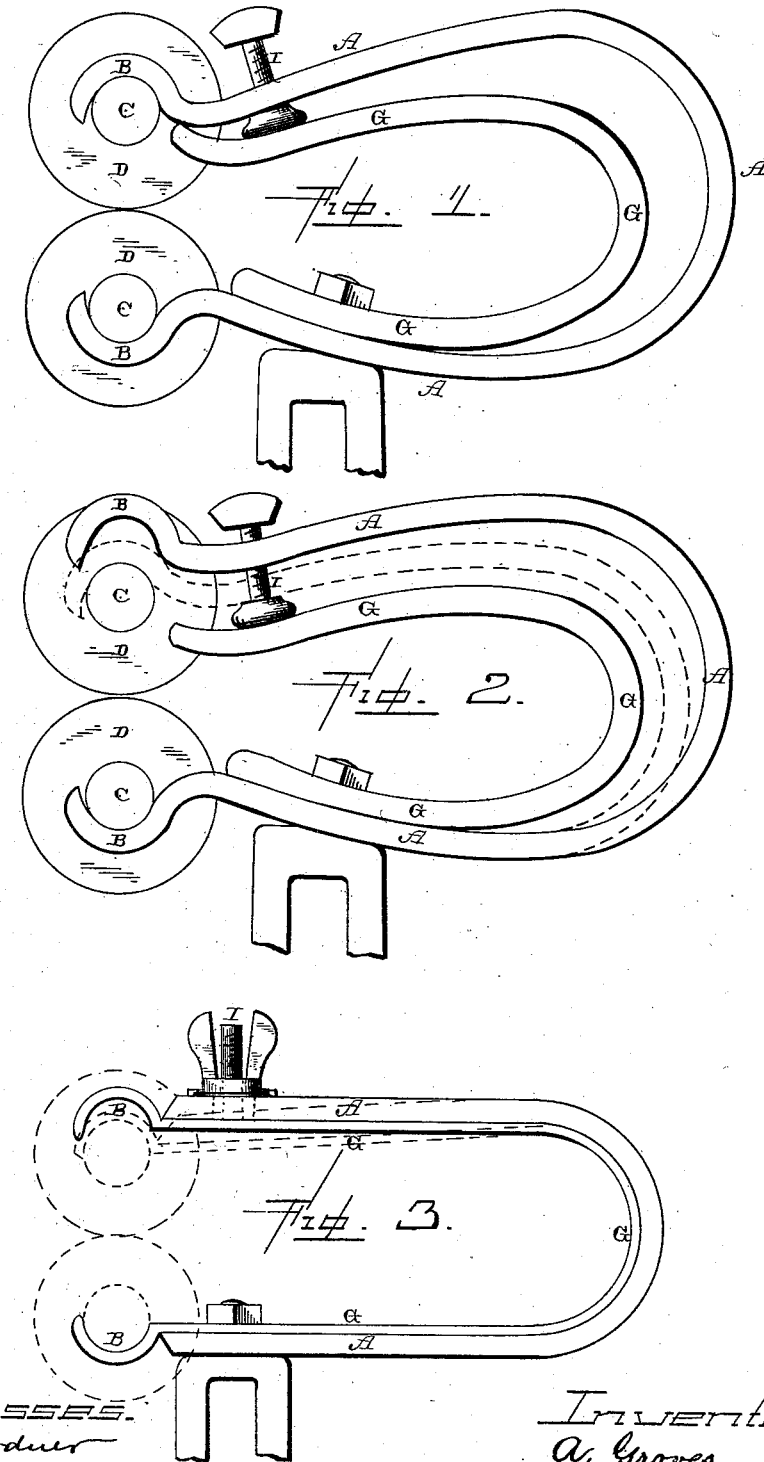
Witnesses
L. H. Gardner
Edw. P. Ellis
Inventor
A. Groves
per J. A. Lehmann, atty

UNITED STATES PATENT OFFICE.

ARTHUR GROVES, OF LA DUE, MISSOURI.

CLOTHES-WRINGER.

SPECIFICATION forming part of Letters Patent No. 389,805, dated September 18, 1888.

Application filed May 10, 1887. Serial No. 237,764. (No model.)

*To all whom it may concern:*

Be it known that I, ARTHUR GROVES, of La Due, in the county of Henry and State of Missouri, have invented certain new and useful Improvements in Clothes-Wringers; and I do hereby declare the following to be a full, clear, and exact description of the invention, such as will enable others skilled in the art to which it pertains to make and use it, reference being had to the accompanying drawings, which form part of this specification.

My invention relates to an improvement in clothes-wringers; and it consists in a compound spring consisting of two U-shaped springs arranged one within the other, the said spring being provided with bearings for the rolls and with a set-screw, which passes through one of the single springs and bears against the free end of the other single spring, as will be more fully described hereinafter.

The object of my invention is to use two U-shaped springs, which are somewhat similar in shape, but of different tensions, one of which is placed inside of the other, whereby the same machine is adapted to wring articles of different thicknesses without any excessive labor upon the operator and any danger of breaking the wringer.

Figure 1 represents one end of a wringing-machine to which my invention is applied, the ends of the springs being shown closed together. Fig. 2 is a similar view showing the ends of the springs separated. Fig. 3 is a side elevation showing a slight modification.

A represents the ordinary U-shaped or bent spring, which is used in wringing-machines of a certain class, and which has its ends B so shaped as to form bearings for the shaft C of the wringer-rolls D. Placed inside of this spring A is another spring, G, either of the same or greater tension than the one A, and which is made shorter than the other. As shown in Figs. 1 and 2, this spring G is placed inside of the one A, and passing down through one end of the spring A is a regulating-screw, I, by means of which the ends of the two springs may be separated, as shown in Fig. 2. When the two springs are in their normal positions, as shown in Fig. 1, their ends are in close contact and the rolls D are forced together with the whole tension of the spring A. In this position the rolls D are adjusted to wring smaller articles; but if it is attempted to wring large articles with the rollers in this position a great expenditure of power by the operator is necessary.

When it is desired to adjust the wringer to wring large articles, or it is desired to remove the rollers D from the spring A for any purpose, it is only necessary to tighten up upon the regulating-screw I, when the ends of the springs will be separated, as shown in Fig. 2, the end of the spring G being forced inward and the ends of the spring A being forced outward, as shown. In proportion as the ends of the springs A are forced apart by the screws I the pressure of the springs upon the articles being wrung out is lessened. At the same time the spring G is closed more or less according to its elasticity or strength, and by its natural tendency to open assists to neutralize the elasticity of the outer spring, A. The effectiveness of this action depends solely upon the relative power of the two springs.

By means of the construction above described the pressure of the springs A upon the articles to be wrung out is regulated at will at the same time that the elasticity of the springs is preserved. By turning the set-screw I so that the ends of the spring G are forced downward and the end of the spring A outward the rollers can be separated sufficiently far to allow large articles to be wrung out without any extra labor upon the part of the operator.

Instead of the two springs A G being arranged as shown in Figs. 1 and 2 they may be arranged as shown in Fig. 3. The weaker spring, G, is placed inside, and has the set-screw I connected directly to it and passing through the stronger spring, A. By moving the thumb-nut the end of the spring G can be forced downward away from the end of the spring A and thus be made to exert a greater pressure upon the rollers D when so desired. When the thumb-screw is loosened, the spring G moves from the position shown in dotted lines outward against the inner side of the spring A, as shown in solid lines, in which position the two springs are at rest. In proportion as the two springs are separated by the thumb-screw the tension of both springs is brought into play, for the spring G is forced down upon the rollers at the same time that the spring A is forced outward. The screw-rod I passes loosely through the spring A, but the thumb-nut must be swiveled upon it.

Having thus described my invention, I claim—

In a wringer, a compound spring consisting of two U-shaped springs arranged one within the other, said spring being provided with bearings for the rolls and also provided with a set-screw that passes through one of the single springs and bears against the free end of the other single spring, substantially as shown and described.

In testimony whereof I affix my signature in presence of two witnesses.

ARTHUR GROVES.

Witnesses:
JOHN HUTCHINSON,
BERT L. ROBINSON.